Sept. 4, 1956
R. C. FRIEDLY ET AL
2,761,229
BILLET IDENTIFICATION
Filed Aug. 13, 1954
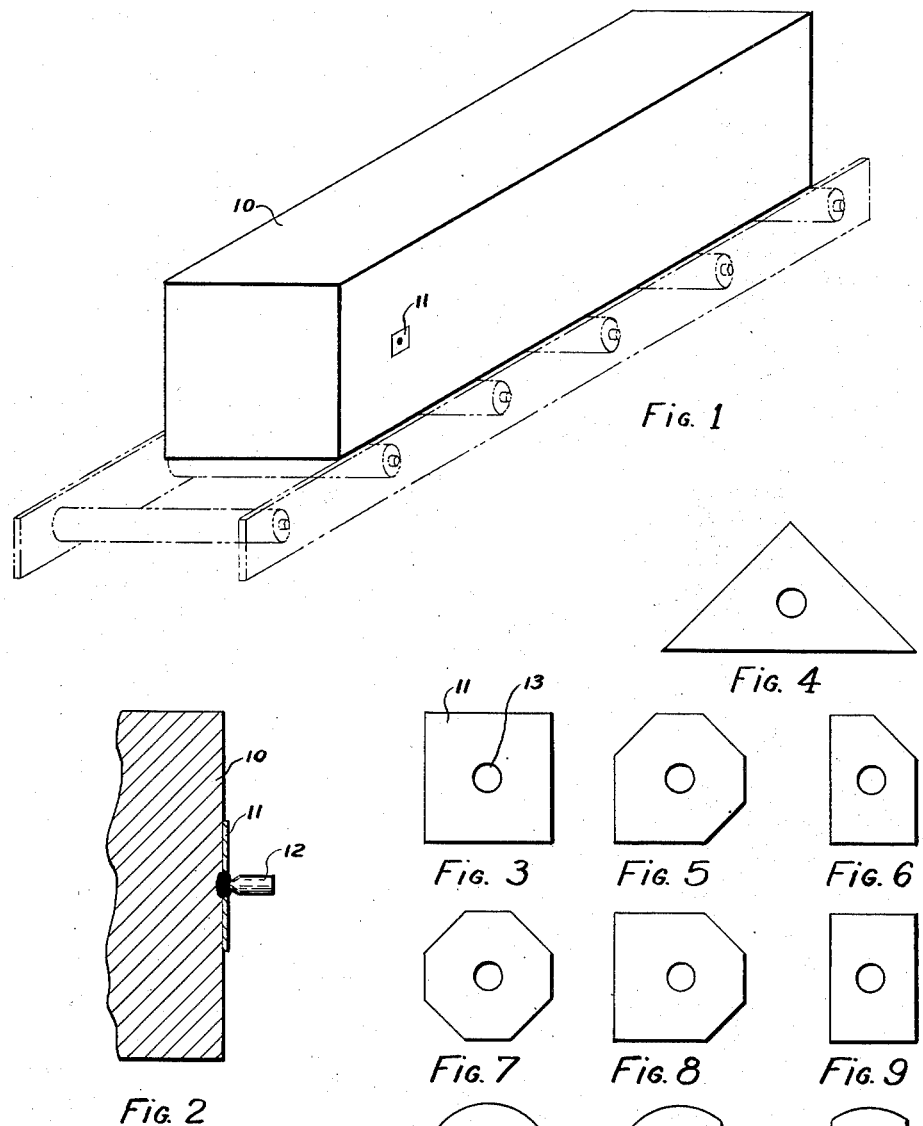
INVENTORS
Robert C. Friedly
William G. Tarbee
Robert C. Singleton
By Clyde H. Haynes
their Atty.

United States Patent Office 2,761,229
Patented Sept. 4, 1956

2,761,229
BILLET IDENTIFICATION

Robert C. Friedly, Park Ridge, Ill., William G. Tawse, Sacramento, Calif., and Robert C. Singleton, Oberlin, Ohio, assignors to Gregory Industries, Inc., Detroit, Mich., a corporation of Michigan Application August 13, 1954, Serial No. 449,750

1 Claim. (Cl. 40—2.2)

The present invention relates to method and apparatus for identifying billets.

There has long been a problem of identifying billets and other metal masses which are being heated close to their melting point which may be up to 2000° F. or more. One of the reasons for marking the billet to identify it is the direct result of short run operations in steel mills and the need for positive control of material analysis and heat identification. In these short run operations the mill will have a small order for one type of steel, a small order for another type of steel and perhaps small orders for a half dozen other kinds of steel. The identification is very necessary when these billets of different kinds of materials are in the furnace at the same time. The identification marker must be easily recognized since the terrific heat prevents men from working close to the billets for a long period of time.

In the past steel mills have attempted to mark billets by stamping an identification mark in the billet. This proved satisfactory in some instances but the majority of cases was unsatisfactory because the billet scaled and corroded to the point where the mark could not easily be recognized.

One of the objects of the present invention is to provide an arrangement for marking billets.

Another object of the invention is to provide an identification for billets so that visible inspection will indicate the material in the billet.

A further object of the invention is to provide an identification for billets which is inexpensive, easy to fasten to the billet and will withstand the high temperatures to which the billet is to be subjected.

Other objects and a fuller understanding of the invention will become apparent from the description and claim and the drawings in which:

Figure 1 is an isometric view of a billet having a marker secured thereto;

Figure 2 is a fragmentary enlargement along the line 2—2 of Figure 1; and

Figures 3 to 12 inclusive, are planned views of various markers.

The billet 10 illustrated in Figure 1 has an identifying marker 11 secured in a visible position thereto. This marker 11 is constructed of metal which will withstand the temperatures that the billet will be subjected to during the heating of the billet. The marker 11 may be of the respective one of the designs of Figures 3 to 12 inclusive which corresponds to and identifies the material or analysis of the billet. The marker 11 is fastened to the billet 12 by end arc spot welding using a welding stud 12 as illustrated in Figure 2. The marker 11 is somewhat washer or wafer shaped and is provided with the spot weld hole 13 during its manufacture and end arc welding stud 12 cooperates with this hole 13 in welding the marker to the billet. The stud 12 may be grooved and the extension portion broken off to leave a nearly flush weld on the surface of the marker. The details of the actual welding process are not described herein, since this method of spot welding using end arc studs is prior art as taught by the Patent No. 2,635,167 issued to Ted Nelson on April 14, 1953.

In the marking of billets for identification purposes the marker must be permanently secured to the billet and must be quickly fastened thereto. In the present instance the markers can be quickly fastened to the billet and are of material which will permanently identify the billet even though it has rusted or corroded.

In practicing the present invention the worker in a steel mill identifies the material in a billet as soon as it is made. He then chooses a marker which was previously designated to identify that material from a group of markers such as those illustrated in Figures 3 through 12. After the identifying marker has been correctly chosen, it is spot welded to the marker using the stud 12. The marker will thus remain on the billet regardless of the accumulation of scale and can be used throughout the remaining heating operations to identify the billet according to material.

It is understood that designs or geometric patterns of markers other than those illustrated, may be used without departing from the spirit and scope of the invention. It is also understood that the present invention can be used for identifying other masses of weldable material regardless of size and shape providing the mass has a spot on which the identifying marker can be welded.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claim which is made a part hereof.

The embodiments of the invention in which an exclusive property or privilege is claimed are defined as follows:

A manufacturing article comprising, billet of metal having a surface of a general size and shape and capable of heavily scaling and discoloring when the billet is heated above a certain temperature, a wafer-like marker of an identifying size and shape and of a material capable of maintaining its general size and shape when heated to above said certain temperature, said wafer being of a contrasting size and shape to a wafer on another billet of similar size and shape of different material, and weld metal securing said identifying wafer to said surface to identify said billet before and after the billet is heated to said certain temperature regardless of the scaling and discoloring formed on the billet during heating at or above said certain temperature.

References Cited in the file of this patent
UNITED STATES PATENTS

| | | |
|---|---|---|
| 2,173,752 | Carrington | Sept. 19, 1939 |
| 2,613,462 | Johnson | Oct. 14, 1952 |

FOREIGN PATENTS

| | | |
|---|---|---|
| 36,602 | Denmark | Dec. 27, 1926 |